US010088866B2

(12) United States Patent
Braun et al.

(10) Patent No.: US 10,088,866 B2
(45) Date of Patent: Oct. 2, 2018

(54) CONTROLLING THE ORIENTATION OF A DEVICE DISPLAY BASED ON USAGE CONTEXT

(71) Applicant: Motorola Mobility LLC, Chicago, IL (US)

(72) Inventors: Mark Braun, Arlington Heights, IL (US); Francis Forest, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 205 days.

(21) Appl. No.: 14/661,132

(22) Filed: Mar. 18, 2015

(65) Prior Publication Data
US 2016/0274622 A1 Sep. 22, 2016

(51) Int. Cl.
G06F 1/16 (2006.01)
G06K 9/00 (2006.01)
(Continued)

(52) U.S. Cl.
CPC .......... *G06F 1/1626* (2013.01); *G06F 1/1694* (2013.01); *G06F 3/013* (2013.01); *G06K 9/00221* (2013.01); *G06K 9/228* (2013.01); *G06K 9/3208* (2013.01); *G09G 5/00* (2013.01); *G06F 2200/1614* (2013.01); *G06F 2200/1637* (2013.01); *G06K 2009/3291* (2013.01); *G09G 2320/0261* (2013.01);
(Continued)

(58) Field of Classification Search
None
See application file for complete search history.

(56) References Cited

U.S. PATENT DOCUMENTS 7,724,296 B2  5/2010  Lonn
RE42,639 E    8/2011  Anderson
(Continued)

FOREIGN PATENT DOCUMENTS

EP  2428864 A2  3/2012
EP  2685341 A1  1/2014
(Continued)

OTHER PUBLICATIONS

Samsung Galaxy, "Sprint Cell Phones: What is the Smart Rotation Feature on my Samsung Galaxy S4?" http://www.samsung.com/us/support/faq/FAQ00053261/62634/SPH-L720ZBASPR#; Mar. 31, 2015, 3 pages.
(Continued)

Primary Examiner — Ryan M Gray
(74) Attorney, Agent, or Firm — Amerson Law Firm, PLLC

(57) ABSTRACT

A method for controlling an orientation of data on a display of a device, includes determining a device angular position for the device, determining a usage context parameter for the device, and controlling the orientation of the data on the display based on the device angular position and the usage context parameter. A device includes a display, an orientation sensor to determine a device angular position for the device, and a processor coupled to the orientation sensor. The processor is to determine a usage context parameter for the device and control the orientation of the data on the display based on the device angular position and the usage context parameter.

10 Claims, 4 Drawing Sheets

(51) Int. Cl.
*G09G 5/00* (2006.01)
*G06F 3/01* (2006.01)
*G06K 9/22* (2006.01)
*G06K 9/32* (2006.01)

(52) U.S. Cl.
CPC . *G09G 2340/0492* (2013.01); *G09G 2354/00* (2013.01); *H04N 2201/0096* (2013.01)

(56) References Cited

U.S. PATENT DOCUMENTS

| | | | | |
|---|---|---|---|---|
| 2012/0057064 | A1* | 3/2012 | Gardiner | G06F 1/1626 |
| | | | | 348/333.12 |
| 2013/0141464 | A1* | 6/2013 | Hunt | G06F 1/1626 |
| | | | | 345/659 |
| 2014/0267006 | A1* | 9/2014 | Raffa | G06F 1/1626 |
| | | | | 345/156 |
| 2014/0320536 | A1* | 10/2014 | Mok | G06T 3/60 |
| | | | | 345/659 |
| 2015/0022558 | A1* | 1/2015 | Li | G09G 5/38 |
| | | | | 345/650 |
| 2015/0042554 | A1 | 2/2015 | Chen et al. | |

FOREIGN PATENT DOCUMENTS

| | | |
|---|---|---|
| EP | 27091046 A1 | 2/2014 |
| EP | 2713242 A2 | 4/2014 |
| WO | 2014066703 A2 | 5/2014 |

OTHER PUBLICATIONS

Combined Search and Examination Report from corresponding UK Application No. GB1604166.7 dated Aug. 9, 2016.

\* cited by examiner

CONTROLLING THE ORIENTATION OF A DEVICE DISPLAY BASED ON USAGE CONTEXT

BACKGROUND OF THE INVENTION

1. Field of the Invention

The disclosed subject matter relates generally to computing systems and, more particularly, to controlling the orientation of a device display based on usage context.

2. Description of the Related Art

Handheld computing devices, such as mobile phones and tablets typically control the orientation of the data displayed on a screen of the device based upon how a user is holding the device. An orientation sensor measures the position of the device relative to the earth and changes the display orientation in response to the user rotating the device. In general, the orientation sensor may be implemented using a virtual sensor that receives information from a physical sensor and uses that information to determine the position of the device. The orientation sensor may determine the position in a plane essentially perpendicular to the earth's surface (i.e., a vertical plane) or a plane essentially parallel to the earth's surface (i.e., a horizontal plane). Consider a mobile device having a generally rectangular shape with long and short axes. If the user is holding the device such that the long axis is generally perpendicular to the earth, the display orientation is set to portrait mode. If the user rotates the device such that the long axis is orientated generally parallel to the earth (i.e., holds the device sideways), the orientation sensor detects the changed position and automatically changes the display orientation so that the data is displayed in landscape mode. This process is commonly referred to as auto-rotate mode.

Because the earth is used as a reference, with the auto-rotate feature enabled, the device may change the orientation of the data unexpectedly and inconveniently for the user under certain conditions. There are instances when the user is holding the device at an angle without wanting the display orientation to rotate. For example, consider a user reclining on a couch with the device attempting to view the display in portrait orientation. The device is aligned to the user in portrait mode relative to the user's face, but relative to the earth reference, the device is sensed as being held at a 45° angle. Because, the orientation sensor and the auto-rotate logic determine the angular position of the device relative to the ground, the device may automatically change the display orientation to landscape mode, which is actually not aligned with the user's face. In response, the user typically rotates the device to attempt to force the device to change back to the desired portrait mode. The user may have to repeat the process of rotating the device to get the desired orientation and find a position for holding the device that does not trigger the auto-rotation. This situation is inconvenient for the user and may reduce the quality of the usage experience.

The present disclosure is directed to various methods and devices that may solve or at least reduce some of the problems identified above.

BRIEF DESCRIPTION OF THE DRAWINGS

The disclosure may be understood by reference to the following description taken in conjunction with the accompanying drawings, in which like reference numerals identify like elements, and in which.

Figure 1:
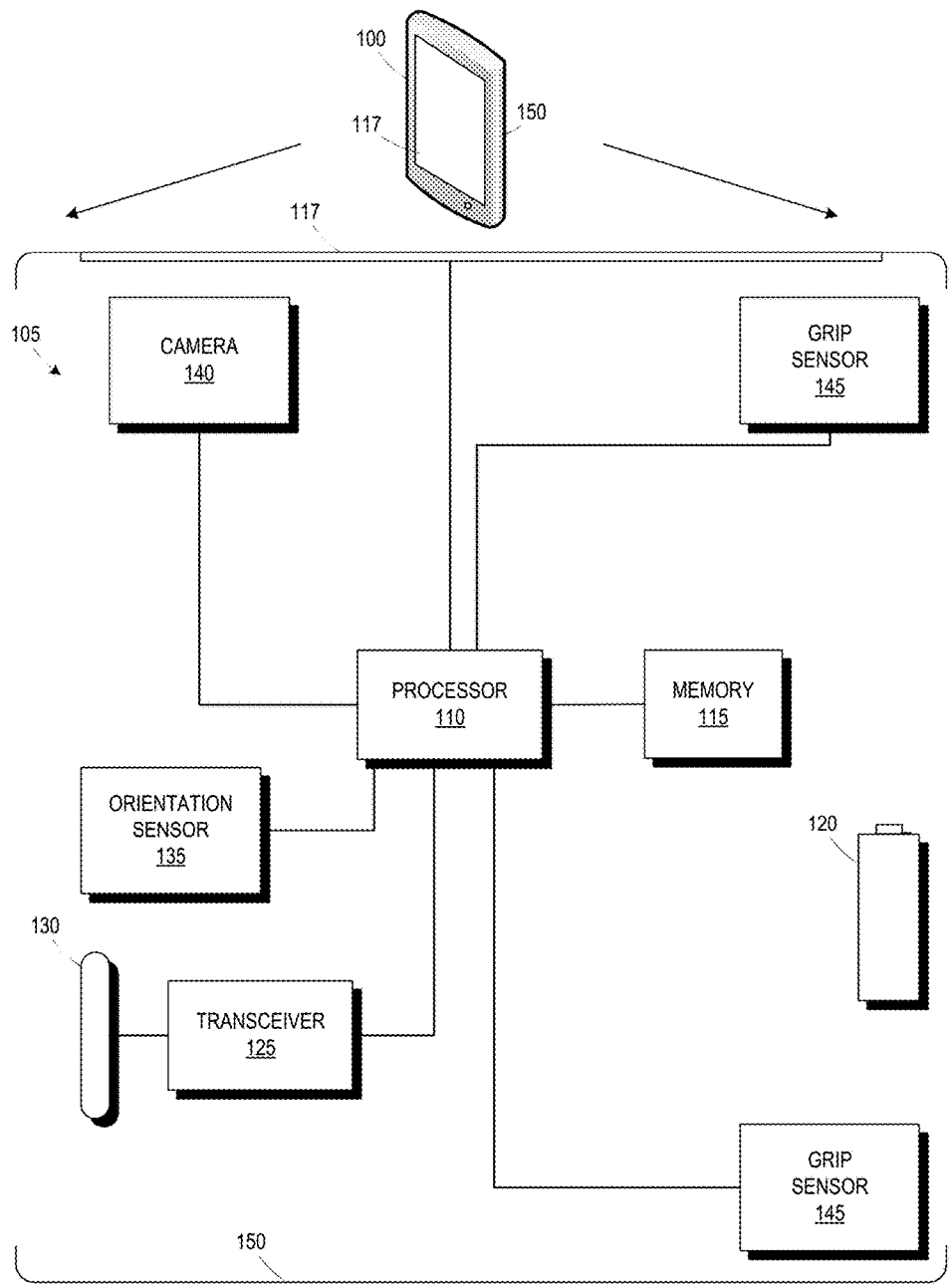
FIG. 1 is a simplified block diagram of a device including a computing system configured to control the orientation of a device display based on usage context, according to some embodiments.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIGS. 1-6 illustrate example techniques for controlling the orientation of a display of a device based on one or more usage context parameters. Usage context parameters, such as user facial position, user grip position, or user reactions are incorporated into an auto-rotation decision making process to improve the operation of the device and enhance the user's experience. The incorporation of usage context parameters reduces the likelihood and/or frequency of unexpected or undesired orientation changes. The device may identify a display orientation change event and decide to implement or suppress a change in the display orientation depending on whether the orientation change is consistent with the usage context information. If the orientation change is inconsistent with other information, such as the user's facial position or hand grip, the orientation change may be suppressed. If the user reacts to an orientation change by changing the device position to force a change back to the previous orientation, the angle threshold for implementing future orientation changes may be changed, or the auto-rotation feature may be disabled, for example, after querying the user about locking the orientation.

FIG. 1 is a block diagram of a device 100 including a computing system 105. The computing system 105 includes a processor 110, a memory 115, a display 117, and a battery 120 to provide power for the computing system 105. The memory may be a volatile memory (e.g., DRAM, SRAM) or a non-volatile memory (e.g., ROM, flash memory, etc.). In some embodiments, the device 100 may be a communications device, such as a mobile phone, and the computing system may include a transceiver 125 for transmitting and receiving signals via an antenna 130. The transceiver 125 may include multiple radios for communicating according to different radio access technologies, such as Wi-Fi or cellular. An orientation sensor 135 (e.g., an accelerometer, magnetometer, mercury switch, gyroscope, compass, or some combination thereof) is provided to measure the position of the device 100 relative to a physical reference point or surface. The orientation sensor 135 may be a physical sensor or a virtual sensor that receives data from a physical sensor and processes that data to determine the position of the device 100. Usage context sensors, such as a camera 140 or one or more grip sensors 145 may be provided to gather information regarding how some feature or thing positioned outside of the device 100, such as a user of the device 100, is oriented with respect to the measured position determined by the orientation sensor 135. The device 100 includes an outer casing 150 that supports the display 117 and surrounds the active components of the computing system 105 and provides outer surfaces along which a user interfaces with the device 100. The grip sensors 145 may interface with the casing 150 to determine a user's hand position. In some embodiments, the antenna 130 may serve as a grip sensor in that the gain characteristics of the antenna 130 may change depending on the user's hand position.

The processor 110 may execute instructions stored in the memory 115 and store information in the memory 115, such as the results of the executed instructions. The processor 110 controls the display 117 and may receive user input from the display 117 for embodiments where the display 117 is a touch screen. Some embodiments of the processor 110, the memory 115, and the sensors 140, 145 may be configured to perform portions of the method 200 shown in FIG. 2. For example, the processor 110 may execute an application that may be a portion of the operating system for the computing system 105 to control the orientation of the data on the display 117 based on information from the orientation sensor 135 and usage context parameters, such as from the camera 140, the grip sensors 145, or user actions (rotation reversal or user input). Although a single processor 110 is illustrated, in some embodiments, the processor 110 may include multiple distributed processors. For example, the processor 110 may include a first processing unit to interface with or implement the orientation sensor 135 and a second processing unit to control the orientation of the data on the display 117 based on input from the first processing unit.

In various embodiments, the device 100 may be embodied in handheld or wearable device, such as a laptop computer, a handheld computer, a tablet computer, a mobile device, a telephone, a personal data assistant ("PDA"), a music player, a game device, a device attached to a user (e.g., a smart watch or glasses), and the like. To the extent certain example aspects of the device 100 are not described herein, such example aspects may or may not be included in various embodiments without limiting the spirit and scope of the embodiments of the present application as would be understood by one of skill in the art.

Figure 2:
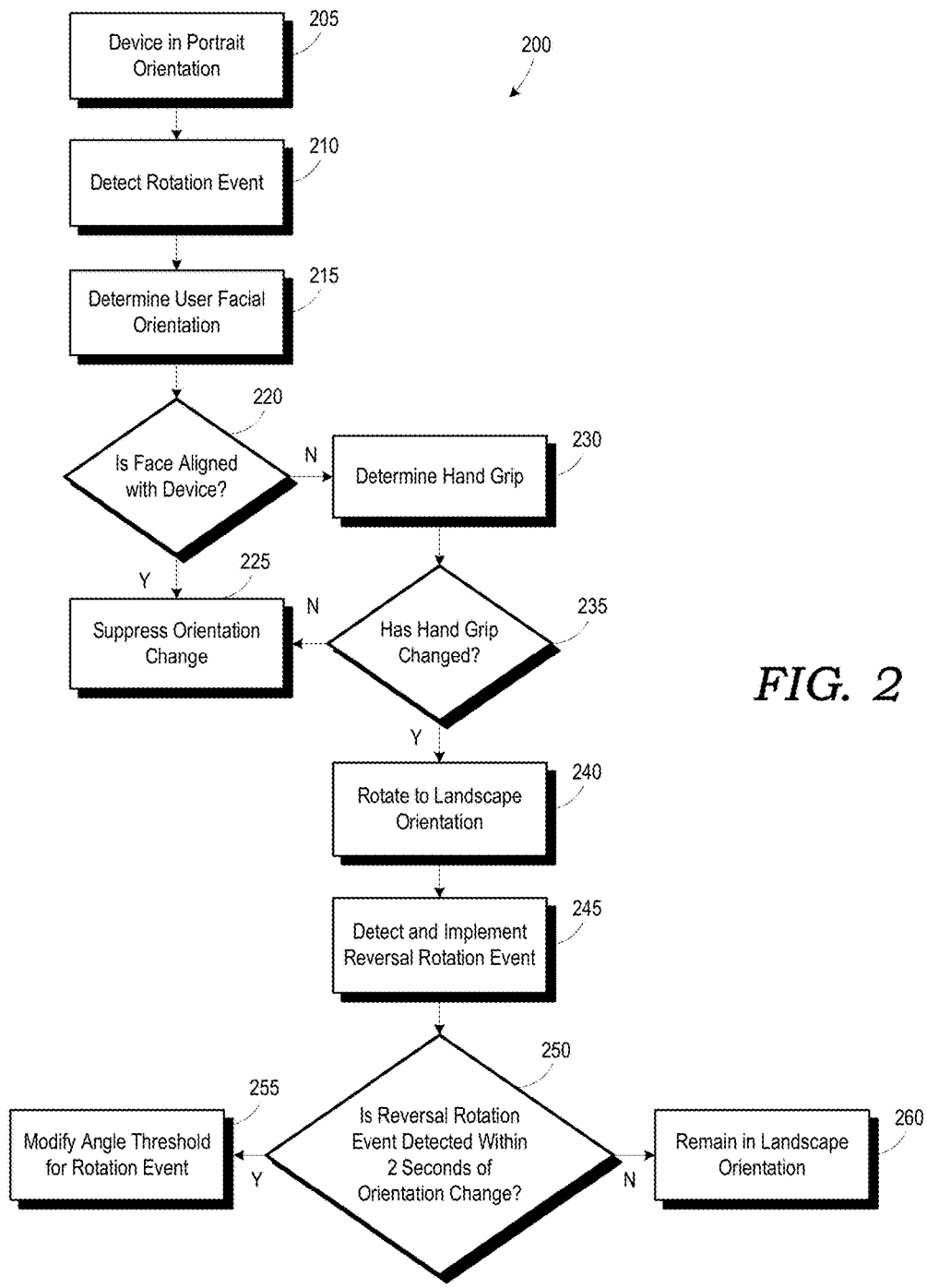
FIG. 2 is a flow diagram of a method for controlling the orientation of a device display based on usage context, according to some embodiments.

FIG. 2 is a flow diagram of an illustrative method 200 for controlling the orientation of data on the display 117, in accordance with some embodiments. In the example illustrated in FIG. 2, the device 100 is initially in portrait orientation in block 205. Of course, the method 200 may be modified for a device starting in landscape mode. In block 210, the device 100 (e.g., the processor 110 executing instructions and receiving data from the orientation sensor 135—see FIG. 1) detects a rotation event, such as the device 100 being rotated beyond a pre-established angular value.

Figure 3:
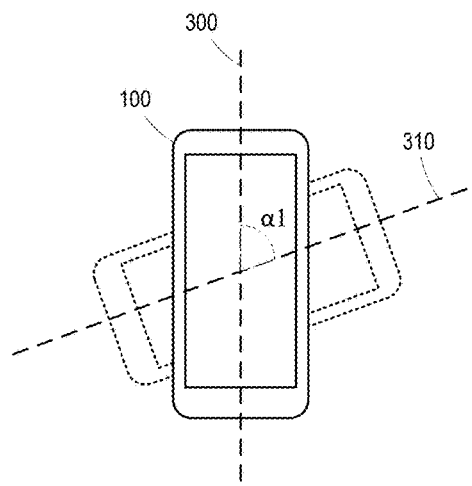
FIGS. 3-5 are diagrams of the device of FIG. 1 illustrating angular position thresholds for implementing orientation changes for the display, according to some embodiments.

FIG. 3 illustrates a front view of the device 100 indicating a reference position 300 of the device 100 that corresponds to a portrait view. Assume for purposes of illustration that the user is holding the device 100 in the reference position 300. If the device 100 is subsequently rotated to a device angular position 310 measured by the orientation sensor 135 that exceeds an orientation angle threshold, $\pm\alpha 1$ (e.g., $\alpha 1=\pm 80$ degrees), from the reference position 300, a rotation event is detected in block 210 of FIG. 2.

Figure 4:
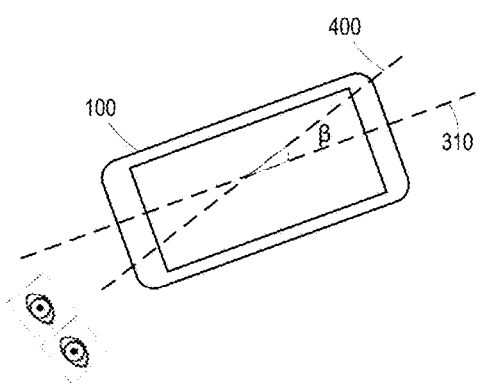

In block 215, a user facial orientation angle is determined. An image of the user may be captured by the camera 140 and the user's facial orientation angular position may be determined. FIG. 4 illustrates how the user's facial position may be compared to the device position. A facial orientation angular position 400 may be determined by processing the captured image to identify the user's eye position, ear position, or some other facial reference. In the example of FIG. 4, the user's facial position is represented as a vertical line positioned between the user's eyes. Of course, other references may be used in some embodiments. The facial orientation angular position 400 may be compared to the device angular position 310. If the difference between the facial orientation angular position 400 and the device angular position 310 is less than a facial alignment threshold, $\beta$, the device 100 may be designated as being aligned with the user's face in block 220 in the portrait orientation, and the orientation change that would have normally resulted from the rotation event detected in block 210 is suppressed in block 225.

If the user's face is not aligned in block 220, the user's grip is determined in block 230 using information from the grip sensors 145 in FIG. 1. The processor 110 monitors the hand position so that the hand positions prior to and after the detection of the rotation event in block 210 are known. Typically, a user changes hand positions when changing the orientation of the device 100. For example, when used in a portrait orientation a user typically holds the device 100 in one hand, while when used in landscape mode, the user typically uses both hands. If the hand grip has not changed, it may indicate that the user is not actually changing the position at which they intend to use the device 100. If the hand grip has not changed in block 235, the orientation change that would have normally resulted from the rotation event detected in block 210 is suppressed in block 225.

If the hand grip is changed in block 235, the rotation event is processed and the orientation of the data on the display 117 is rotated to landscape orientation in block 240.

Figure 5:
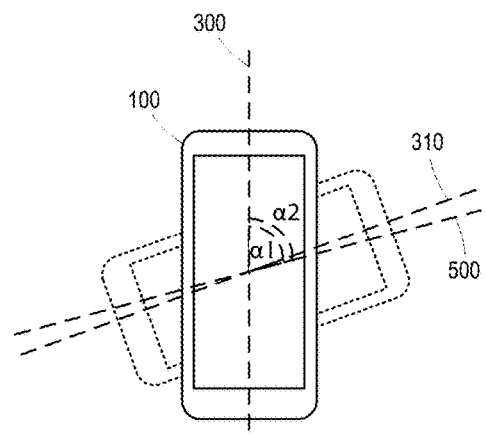

In block 245 a reversal rotation event is detected and implemented. For example, the user may not have wanted the orientation of the data on the display 117 to change, so the user counter-rotates the device 100 to force a change back to portrait orientation. This reversal is a usage context parameter that allows the user's desired orientation to be inferred from the user's actions. If the reversal rotation event occurred within a predetermined number of seconds from the orientation change implemented in block 240 (e.g., 2 seconds), then in block 250, the orientation angle threshold for subsequent rotation events is modified (increased) as indicated in block 255, e.g., $\pm\alpha 2$ (e.g., $\alpha 2 = \pm 85$ degrees) in block 255. This process is illustrated in FIG. 5 wherein the line 500 corresponds to the modified (increased) orientation angle threshold ($\pm\alpha 2$). Modifying the orientation angle threshold for future rotation events reduces the future likelihood that undesired orientation changes will be implemented. The modified orientation angle threshold may remain in effect as long as the display 117 is active, may be used as the default orientation angle threshold for all future uses of the device, and/or may be reset following a power cycle of the device 100.

The method 200 illustrated in FIG. 2 considers three types of usage context parameters, however, the usage context parameters are not limited to the particular examples illustrated herein, and not all of the types of usage context parameters may be used. For example, if facial alignment is not used, blocks 215 and 220 may be omitted and block 210 may transition directly to block 230. If grip position is not used, blocks 230 and 235 may be omitted, and the "N" path from block 220 may transition directly to block 240. If only rotation reversal detection is used, block 210 may transition directly to block 240, and blocks 215-235 may be omitted.

Figure 6:
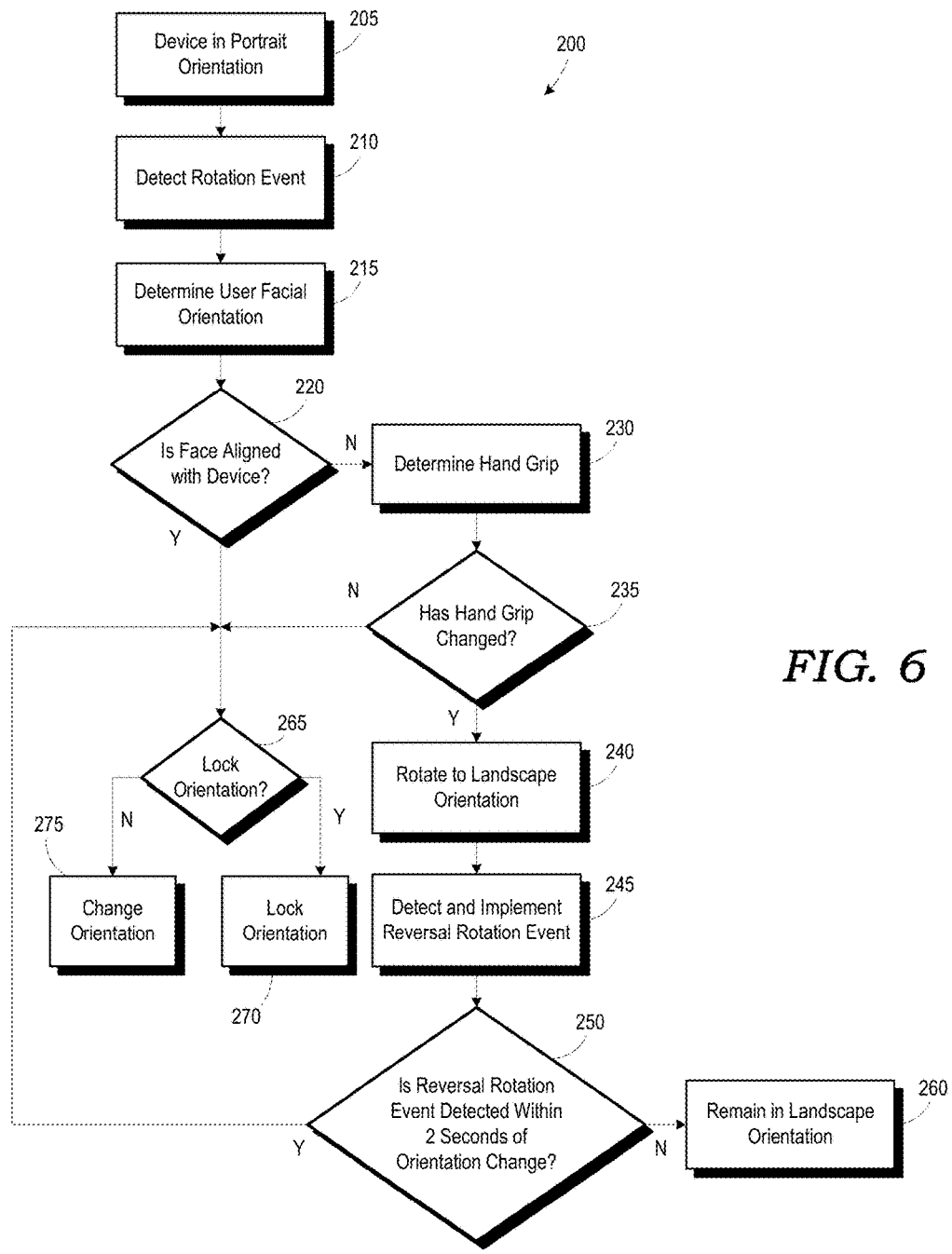
FIG. 6 is a flow diagram of an alternative method for controlling the orientation of a device display based on usage context, according to some embodiments.

In an alternative embodiment of a method 600 for controlling display orientation illustrated in FIG. 6, the usage context parameters may be used to query the user regarding their orientation preference in the event that the usage context parameter is inconsistent with the rotation event detected in block 215. Instead of suppressing the orientation change based on the facial alignment in block 220 or the grip position in block 235 or modifying the orientation angle threshold responsive to the reversal rotation event in block 250 (see FIG. 2), the user may be queried in block 265 whether the orientation of the data on the display 117 should be locked in the previous orientation. If the user wishes to lock the orientation of the data in block 265, the lock is implemented in block 270 until the next timeout of the display 117 or a power cycle of the device 100. If the user does not wish to lock the orientation in block 265, the orientation change is implemented in block 275. Again, other usage context parameters may be employed or certain usage context parameters may be omitted, as described above in reference to FIG. 2.

In an alternative embodiment, detecting the reversal rotation event in block 245 of FIG. 6 may be implemented by querying the user after the initial rotation event implemented in block 240 by displaying a subtle pop-up window that says "Display rotated: tap to revert to (and lock in) previous orientation." In this context the reversal rotation event is detected by registering a tap on the window initiated by the user (i.e., the usage context parameter is user input data) in block 265. The time interval of block 250 may represent the time interval that the pop-up window remains visible prior to fading.

Employing usage context parameters when controlling orientation of data provided on the display 117 enhances the user experience by reducing the likelihood of undesired orientation changes. Rather than requiring the user to struggle to identify a position for holding the device 100 that maintains the desired orientation of the displayed data, the auto-rotation scheme may be adapted based on the usage context parameter(s) to avoid such undesired orientation changes.

In some embodiments, certain aspects of the techniques described above may implemented by one or more processors of a processing system executing software. The methods 200, 600 described herein may be implemented by executing software on a computing device, such as the processor 110 of FIG. 1, however, such methods are not abstract in that they improve the operation of the device 100 and the user's experience when operating the device 100. Prior to execution, the software instructions may be transferred from the non-transitory computer readable storage medium to a memory, such as the memory 115 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method for controlling an orientation of data on a display of a device includes determining a device angular position for the device, determining a usage context parameter for the device, and controlling the orientation of the data on the display based on the device angular position and the usage context parameter.

A device includes a display, an orientation sensor to determine a device angular position for the device, and a processor coupled to the orientation sensor. The processor is to determine a usage context parameter for the device and control the orientation of the data on the display based on the device angular position and the usage context parameter.

A method for controlling an orientation of data on a display of a device includes determining a device angular position for the device, identifying a first display orientation change event responsive to the device angular position exceeding a first orientation angle threshold associated with a first orientation, changing the orientation of the data on the display from the first orientation to a second orientation, identifying a reversal display orientation change event responsive to the device angular position exceeding a second orientation angle threshold associated with the second orientation, changing the orientation of the data on the display from the second orientation to the first orientation, and modifying the first orientation threshold.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A method for controlling an orientation of data on a display of a device, comprising:
    determining a device angular position for the device;
    determining a user context parameter;
    identifying a display orientation change event responsive to the device angular position exceeding an orientation angle threshold associated with a first orientation for displaying the data;
    querying a user of the device for a display orientation preference responsive to identifying the display orientation change event and responsive to determining that the user context parameter is consistent with the first orientation; and
    locking the orientation of the data on the display in the first orientation responsive to the display orientation preference indicating the first orientation.

2. The method of claim 1, wherein determining the usage context parameter comprises detecting a user facial orientation angular position, and determining that the user context parameter is consistent with the first orientation comprises determining that the user facial orientation angular position is aligned with the first orientation.

3. The method of claim 1, wherein determining the usage context parameter comprises monitoring a user grip position for the device, and determining that the user context parameter is consistent with the first orientation comprises determining a user grip position prior to detecting the display orientation change event does not change after detecting the display orientation change event.

4. The method of claim 1, further comprising:
    changing the orientation of the data on the display from the first orientation to a second orientation; and
    identifying a reversal display orientation change event responsive to the device angular position exceeding a second orientation angle threshold associated with the second orientation, wherein determining the usage context data comprises identifying the reversal display orientation change event.

5. The method of claim 1, further comprising suppressing the display orientation change event.

6. A device, comprising:
    a display;
    an orientation sensor to determine a device angular position for the device; and
    a processor coupled to the orientation sensor, wherein the processor is to determine a device angular position for the device, determine a user context parameter, identify a display orientation change event responsive to the device angular position exceeding an orientation angle threshold associated with a first orientation for displaying the data, query a user of the device for a display orientation preference responsive to identifying the display orientation change event and responsive to determining that the user context parameter is consistent with the first orientation, and lock the orientation of the data on the display in the first orientation responsive to the display orientation preference indicating the first orientation.

7. The device of claim 6, further comprising a camera coupled to the processor to capture an image of a user of the device, wherein the processor is to determine a user facial orientation angular position from the image to determine the usage context parameter and determine that the user context parameter is consistent with the first orientation by determining that the user facial orientation angular position being aligned with the first orientation.

8. The device of claim 6, further comprising a grip sensor coupled to the processor to determine a grip position of a user of the device, wherein the user context parameter is the grip position, and the processor is to determine that the user context parameter is consistent with the first orientation by determining that a user grip position prior to detecting the display orientation change event does not change after detecting the display orientation change event.

9. The device of claim 6, wherein the processor is to change the orientation of the data on the display from the first orientation to a second orientation, identify a reversal display orientation change event responsive to the device angular position exceeding a second orientation angle threshold associated with the second orientation, and change the orientation of the data on the display from the second orientation to the first orientation, wherein the usage context data comprises the reversal display orientation change event.

10. The device of claim 6, wherein the processor is to suppress the display orientation change event.

* * * * *